UNITED STATES PATENT OFFICE.

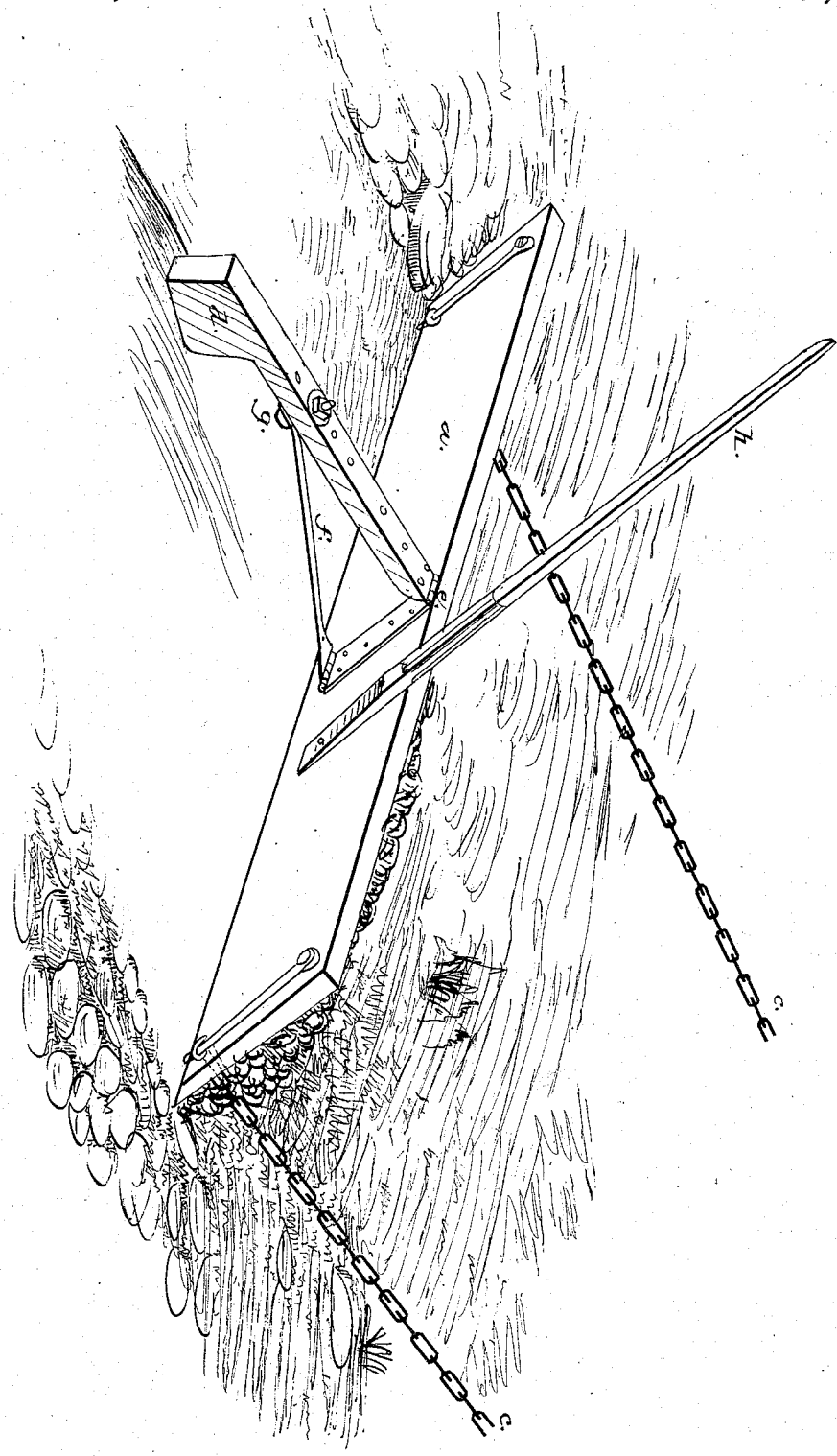

THOMAS PENROSE, OF ELLINGTON, ILLINOIS.

ROAD-SCRAPER AND SPREADER.

Specification of Letters Patent No. 11,173, dated June 27, 1854.

*To all whom it may concern:*

Be it known that I, THOMAS PENROSE, of Ellington, in the county of Adams and State of Illinois, have invented certain new and useful Improvements in Road-Scrapers and Spreaders; and I do hereby declare that the following is a full, clear, and exact description of the construction and operation of the same, reference being had to the accompanying drawings, in which the figure is a perspective view of the implement.

Among the various kinds of road scrapers which have been hitherto invented and used, there are few but what require considerable skill and practice to operate them properly, or they are complicated and expensive in their construction; which objections limit their use, and prevent their application to many other purposes, besides that of road making. They also commonly deposit their loads in heaps, or merely push it to one side of the road.

It is to obviate these objections and to produce an implement which shall combine the functions of a scraper and a spreader together with the power to deposit its load in a heap if so desired, for which my improvement is designed. It is also from its simplicity and easy management adapted to numerous other purposes such as leveling land, cleaning barn yards, deepening ponds, excavating cellars, &c.

In the drawing ($a$) is the scraper which is formed of a plank of suitable wood, which may be shod with a strip of steel or iron ($b$). It is drawn by two chains ($c$) which are attached to the two ends of the scraper only two or three inches from its lower edge, thus counteracting the tendency to trip and discharge the load prematurely, which would be the case were they attached higher up. To keep the scraper inclined at the most effective angle for scraping up and conveying its load, the tail piece ($d$) is attached in the rear of the scraper, to its upper edge, having a foot at the other extremity resting on the ground. To permit of a change in the angle of inclination of the scraper ($a$), the tail piece ($d$) is connected to it by a hinge ($e$); and is held in the required position by the brace ($f$) which is connected, also by a hinge, to the scraper near its lower edge. An eye is formed on the outer end of the brace ($f$) through which, and also through one of the several holes in the tail piece ($d$) a bolt ($g$) passes, which is secured by a nut on the upper side.

($h$) is a stake projecting upward from the back of the scraper to steady the operator when standing on the machine.

In working the scraper the team is attached by the chains ($c$) so as to draw it either at right angles or obliquely to the line of draft. The driver stands behind and adds his weight, if necessary, by standing on the upper edge of the scraper, and the tail piece. When sufficient earth has accumulated in front of the scraper, the operator relieves it of his weight and drives on until he reaches the place where he wishes to deposit the earth. In order to spread it evenly he raises the tail piece until the scraper becomes nearly perpendicular, and the earth is then left behind in a thin layer, as it escapes under the edge of the scraper. By further elevation of the tail piece the implement is then thrown on its face and can be dragged back in that position with but little resistance, and is then righted to collect another load.

What I claim and desire to secure by Letters Patent, is:

The tail piece ($d$) with its adjustable brace ($f$) when combined with a flat scraper, having the points of attachment of its draft chains near its lower edge, in the manner and for the purposes as described.

THOMAS PENROSE.

Witnesses:
PHILO A. GOODWIN,
WM. SHANAHAN,
EDWARD EVERETT.